Nov. 15, 1960
H. L. KELLOGG
2,960,647
SELF-SATURATING MAGNETIC AMPLIFIER
Filed July 11, 1957
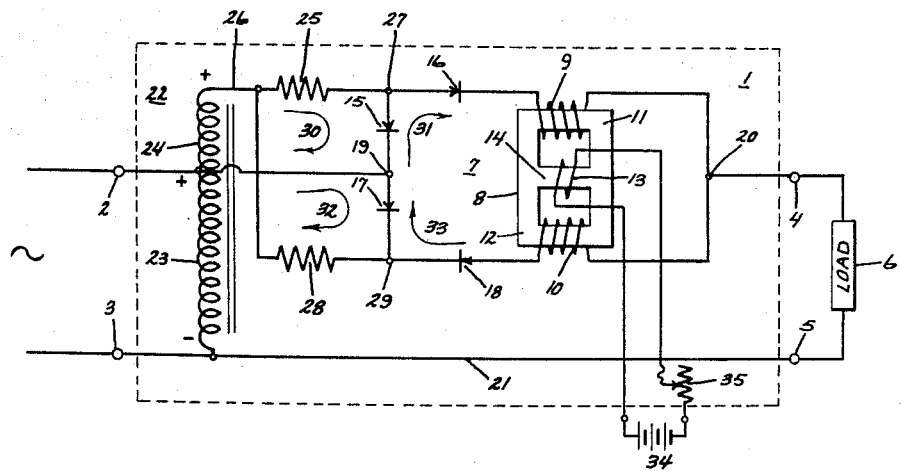
Inventor:
Harry L. Kellogg,
by Robert G. Irish
His Attorney.

2,960,647
SELF-SATURATING MAGNETIC AMPLIFIER

Harry L. Kellogg, Fort Wayne, Ind., assignor to General Electric Company, a corporation of New York Filed July 11, 1957, Ser. No. 671,299

5 Claims. (Cl. 323—89)

This invention relates to self-saturating magnetic amplifiers and more particularly to a self-saturating magnetic amplifier circuit providing fast response in the turn-off direction.

A self-saturating magnetic amplifier basically includes a reactor having a saturable core with a winding, commonly referred to as a gate winding thereon, the gate winding being connected in series with a half-wave rectifier and the load across a source of alternating current. It will be recalled that a reactor displays very high impedance when its core is unsaturated and very low impedance when its core is saturated. The core of the reactor is also conventionally provided with a direct current bias or control winding commonly energized from a source of selectably variable direct current voltage. The bias winding therefore provides a predetermined M.M.F. level in the core, commonly referred to as the reset level. The half cycle of applied voltage during which the half-wave rectifier passes current through the gate winding is referred to as the gating half cycle and it will be readily apparent that if the voltage applied to the control winding is of the proper magnitude and polarity, the current flowing in the gate winding circuit to the load will never be sufficient to provide the additional M.M.F. required to saturate the core; the core will thus remain in the unsaturated condition with the gate winding displaying its maximum impedance and the current flowing during the gating half cycle to the load will thus be at a minimum. It will also be seen that the voltage applied to the control winding may be varied so that at some point during that gating half cycle, the load current is sufficient to produce the additional M.M.F. needed to saturate the core thus causing the core to become saturated and its impedance suddenly to drop to a very low level; thus in turn causing a very great increase in the current flowing through the load. It will now be seen that the R.M.S. current flowing through the load, as read by an alternating current ammeter, will be dependent upon the point during each gating half cycle at which the core is driven into saturation.

During the half cycle when the half-wave rectifier is not passing current through the gate winding to the load, referred to as the resetting half cycle, the M.M.F. provided by the control winding resets the core, i.e., causes the fluxdensity of the core to retrace its dynamic hysteresis loop from the point reached during the previous gating half cycle to the point established by the level and polarity of current flowing in the control winding circuit. It will now be recalled that with sharply saturating magnetic core materials, the core can be driven into saturation in response to a relatively small change in magnetizing force. It is thus seen that a small change in the level of the control voltage applied to the control winding will produce a substantial shift in the point at which the core is driven into saturation responsive to the flow of current in the gate winding circuit and thus in the R.M.S. current in the load.

The speed of response of self-saturating magnetic amplifiers in the direction of increased load current, commonly referred to as the turn-on direction, is very fast, however, the speed of response in the direction of decreased load current, commonly referred to as the turn-off direction tends to be slower, particularly in full-wave alternating current output self-saturating magnetic amplifier circuits in which a pair of gate windings are connected in a loop circuit with a pair of half-wave rectifiers which permit the flow of circulating current in the loop circuit, commonly referred to as doubler circuits (as shown for example in Patent 2,126,790, of August 16, 1938 to F. G. Logan). This slower speed of response in the turn-off direction is caused by the fact that a sudden change in the direct current flowing in the control winding in the direction to cause a decrease in the load current induces a transient voltage in the gate winding by transformer action which tends to cause current to continue to flow in the gate winding circuit during the resetting half cycle thus preventing resetting of the core to the desired level.

Various methods of improving the speed of response of self-saturating magnetic amplifiers in the turn-off direction have been proposed in the past, such as that shown in Patent 2,733,306 of January 31, 1956 to B. D. Bedford, and assigned to the assignee of the present application. In that patent there is disclosed the provision of a resistor in series with the gate winding and half-wave rectifier, with a source of auxiliary voltage and another half-wave rectifier connected in series across the resistor and providing a voltage during the resetting half cycle of sufficient magnitude and proper polarity to oppose the flow of transient current in the gate winding circuit caused by a sudden change in the signal applied to the control winding in the turn-off direction. While that arrangement provided a satisfactory speed of response in the turn-off direction, the load current during the gating half cycle was required to flow through the additional resistor thus causing an appreciable voltage drop across the resistor and a corresponding reduction in the output voltage.

It is therefore desirable to provide an improved self-saturating magnetic amplifier circuit having fast response in the turn-off direction and in which the load current during the gating half cycle does not flow through a resistor.

Another object of this invention is to provide an improved self-saturating magnetic amplifier circuit having fast response in the turn-off direction in which the flow of transient current during the resetting half cycle in response to a sudden change in the control signal in the turn-off direction is bucked by an opposing voltage and in which the load current is not required to flow through a resistor during the gating half cycle.

Another object of this invention is to provide an improved full-wave alternating current output self-saturating magnetic amplifier having fast response in the turn-off direction in which voltages are provided for bucking the flow of transient current during the resetting half cycles caused by a sudden change in the control signal in the turn-off direction and in which the load current is not required to flow through resistors during the gating half cycles.

Further objects and advantages of my invention will become apparent by reference to the following description and the accompanying drawing, and the features of novelty which characterize this invention will be pointed out with particularity in the claims annexed to and forming a part of this specification.

My invention bears certain similarities to the circuits shown in the afore-mentioned Bedford patent, but utilizes the principle that by passing a forward current through a rectifier from a separate source, the rectifier is made conductive and other currents can be superimposed in reverse direction upon the forward current, as long as they do not exceed the forward current, i.e., as long as the net current flowing in the rectifier is in the forward direction; this principle is discussed in an article entitled "Fast Response Multi-Stage Magnetic Amplifiers" by Clifford C. Voice, appearing in Proceedings of the National Electronics Conference, 1956, volume 12, page 416, and in Radar Systems Engineering, by Lewis N. Ridenour, published by the McGraw-Hill Company in 1947, pages 503–506. My invention therefore in its broader aspects provides a self-saturating magnetic amplifier having a saturable core reactor with a gate winding and a pair of oppositely polarized half-wave rectifiers connected in series therewith, the serially connected gate winding and rectifiers being connected in series with the load and a source of alternating current. Means are provided for providing a selectively variable resetting M.M.F. for the core of the reactor and an auxiliary source of alternating current voltage and an impedance are connected in a series circuit across one of the rectifiers. The auxiliary source of alternating current voltage and the impedance are arranged to cause current to flow during the gating half cycle in the series circuit and through the rectifier therein in a forward direction at least equal to the current drawn by the load thus permitting the superimposed load current to flow in a reverse direction through that rectifier during the gating half cycle. The rectifier which is shunted by the auxiliary source of voltage and the impedance serves to block the current in the gate winding during the resetting half cycle responsive to a sudden change in the resetting M.M.F. in a direction to reduce the load current and the auxiliary source of voltage bucks the current in its series circuit.

The single figure of the drawing schematically illustrates a full-wave self-saturating magnetic amplifier incorporating my invention.

Referring now to the drawing, my improved fast response magnetic amplifier, generally identified as 1, is shown within the box formed of dashed lines, and includes a pair of input terminals 2 and 3 adapted to be connected to a suitable source of single phase alternating current (not shown) and a pair of output terminals 4 and 5 adapted to be connected to a load 6. A reactor 7 is provided having a core 8 formed of suitable sharply saturating magnetic material and shown here as being of the 3-legged variety. Core 8 has gate windings, 9 and 10, wound on its outer legs 11 and 12 respectively, and a direct current bias or control winding 13 wound on its center leg 14.

A pair of oppositely polarized half-wave rectifiers 15 and 16 are provided connected in series with gate winding 9 between input terminal 2 and output terminal 4. Another pair of oppositely polarized half-wave rectifiers 17 and 18 are provided also connected in series with gate winding 10 between input terminal 2 and output terminal 4. It will now be seen that the gate windings 9 and 10 and the half-wave rectifiers 15, 16, 17, and 18 are connected in a loop circuit with input terminal 2 being connected to the mid-point 19 between half-wave rectifiers 15 and 17 and output terminal 4 being connected to the mid-point 20 between gate windings 9 and 10. It will also be seen that the half-wave rectifiers 17 and 18 are respectively oppositely polarized from the half-wave rectifiers 15 and 16, i.e., rectifier 17 is oppositely polarized from its adjacent rectifier 15. Input terminal 3 is directly connected to output terminal 5 by line 21.

An autotransformer, generally identified as 22, is provided having its primary winding 23 connected across input terminals 2 and 3 and having an extension winding portion 24. A resistor 25 is provided connected between the end 26 of extension winding 24 and point 27 intermediate rectifiers 15 and 16. It is thus seen that the extension winding 24 and the resistor 25 form a series circuit connected across half-wave rectifier 15. Another resistor 28 is provided connected between end 26 of extension winding 24 and point 29 intermediate half-wave rectifiers 17 and 18. It is thus seen that the resistor 28 and the extension winding 24 form another series circuit connected across the half-wave rectifier 17.

The extension winding 24 and the resistors 25 and 28 are proportioned so as to respectively pass currents through rectifiers 15 and 17 in the forward direction which are at least equal to and preferably substantially greater than the current drawn by the load 6 through gate windings 9 and 10 during their respective gating half cycles. Thus, superimposed load current may be passed in the reverse direction through these rectifiers 15 and 17 during the respective gating half cycles of the gate windings 9 and 10. Considering now the instantaneous condition when input terminal 2 is positive and input terminal 3 is negative, end 26 of extension winding 24 will likewise be positive causing current to flow in the direction of arrow 30 through resistor 25 and rectifier 15. As indicated previously, this flow of current is at least equal to and preferably substantially greater than, i.e., on the order of 400 percent of the load current. Thus, superimposed load current will flow in the direction of the arrow 31 through rectifier 15 in the reverse direction and of course through rectifier 16 and gate winding 9 through the load 6 and back to input terminal 3. During this gating half cycle of gate winding 9 when input terminal 2 is positive with respect to input terminal 3, rectifier 17 blocks the flow of current from end 26 of extension winding 24 through resistor 28 and rectifier 18 blocks the flow of current through gate winding 10. During the next half cycle when input terminal 3 is positive with respect to input terminal 2 and end 26 of extension winding 24 is negative with respect to input terminal 2, the conditions are reversed from the previous half cycle, i.e., current will flow from input terminal 2 through rectifier 17 and resistor 28 in the direction shown by the arrow 32 thus permitting the superimposed flow of load current through gate winding 10, rectifier 18 and in the reverse direction through rectifier 17 as indicated by the arrow 33.

Control winding 13 is adapted to be energized by a suitable source of direct current voltage, such as battery 34 with variable resistor 35 serving selectively to adjust the level of current flowing in the control winding. Assuming now that the variable resistor 35 is adjusted so that maximum current is flowing in load 6 and that input terminal 2 is positive with respect to input 3 so that current is flowing in gate winding 9 in the direction shown by the arrow 31. Assume further that during this gating half cycle, variable resistor 35 is suddenly adjusted to vary the magnitude of the current flowing in control winding 13 so as to reduce or turn off the current flowing in load 6. This adjustment of resistor 35 has no effect on the current flowing in the load during the remainder of the gating half cycle in which input terminal 2 is positive with respect to input terminal 3 since the core 11 of reactor 7 is saturated under the influence of the load current flowing in winding 9. During the next half cycle however, which is the resetting half cycle for gate winding 9, the sudden change in current flowing in control winding 13 tends to induce a voltage in gate winding 9 by transformer action which would keep current flowing in the direction shown by arrow 31 and which would thus prevent control winding 13 from resetting the M.M.F. level in core 11 to the desired level to provide the reduced load current during the next succeeding gating half cycle of winding 9. It will now be observed however, that input terminal 3 is now positive with respect to input terminal 2 and end 26 of extension winding 24 is now negative with respect to input terminal 2 so that current no longer is flowing through rectifier 15 responsive to the voltage induced in extension winding 24. Rectifier 15 now blocks the flow of transient current which otherwise would flow through rectifier 16 and gate winding 9 responsive to the sudden change in the current flowing in control winding 13. It will be observed that the extension winding 24 and resistor 25 form a shunt circuit around rectifier 15, however, it will be recalled that the end 26 of winding 24 is now negative with respect to input terminal 2 and the voltage induced in extension winding 24 is thus now of the proper polarity to buck any tendency for the transient current to flow in this series circuit around the blocking rectifier 15.

It will now be seen that the value of resistors 25 and 28 mainly determines the level of forward current flow through rectifiers 15 and 17 and it will be seen that if the bucking voltage induced in extension winding 24 is made sufficiently large it can oppose extremely fast transient currents and voltages. However, I have found that a voltage induced across extension winding 24 somewhat less than the voltage across input terminals 2 and 3 provides a sufficiently fast speed of response. It will further be observed that the current flowing in the load 6 does not flow through resistors 25 and 28 and thus that there is no resistive voltage drop in the load circuit other than the forward resistance of the rectifiers and the resistance of the gate windings. Thus, there is not found in my improved circuit the voltage drop across resistors responsive to load current and the accompanying reduction in the output voltage found in the circuit of the aforesaid Bedford patent.

My improved circuit connections for providing fast response in the turn-off direction may be utilized with any self-saturating magnetic amplifier circuit and the doubler circuit shown in the drawing and described here-in-above is for illustrative purposes only.

In a circuit assembled in accordance with Fig. 1, for operation from a source of 120 volt, 60 cycle power, autotransformer 22 had an extension portion 24 having approximately 20 volts induced therein. Resistors 25 and 28 respectively had 15 ohms resistance and were of 10 watt capacity. Core 8 of reactor 7 had a stack height of 1.12 inches and was 5 inches long by 4.1 inches wide. The legs 11 and 12 were respectively 0.625 inch wide with center leg 14 being 1.25 inches wide and the portions connecting the end legs 10 and 12 of center leg 13 were 1.25 inches wide. Gate windings 9 and 10 were formed of 64.0 turns of 0.253 inch diameter wire while control winding 13 was formed of 200 turns of .0179 inch diameter wire. Control winding 13 was connected to a 90 volt source of direct current power.

While I have illustrated and described a particular embodiment of this invention, or indicated here-in-above, the invention is not limited to the particular form shown and further modifications and improvements will occur to those skilled in the art. I desire that it be understood therefore that this invention is not limited to the specific embodiment disclosed and I intend in the appended claims to cover all modifications which do not depart from the spirit and scope of this invention.

What I claim as new and desire to secure by Letters Patent of the United States is:

1. A self-saturating magnetic amplifier comprising: an alternating current input circuit adapted to be connected to a source of alternating current; an output circuit adapted to be connected to a load; a reactor having a saturable core with a gate winding thereon; a pair of half-wave rectifiers, said gate winding and said rectifiers being connected in series between said input and output circuits with said rectifiers being oppositely polarized; means for providing a selectively variable resetting M.M.F. for said reactor core; and an auxiliary source of alternating current voltage and impedance means connected in series therewith, said serially connected auxiliary source and impedance means being connected in parallel across one of said rectifiers and arranged to cause current to flow during the gating half cycle in the series circuit of said auxiliary source and said impedance means and through said one rectifier in a forward direction at least equal to the current drawn by said load thereby permitting superimposed load current to flow in a reverse direction through said one rectifier during said gating half cycle; said one rectifier blocking flow of transient current in the gate winding during the resetting half cycle responsive to a sudden change in said resetting M.M.F. in a direction to reduce said load current and said auxiliary source of voltage bucking flow of said transient current in said series circuit.

2. A self-saturating magnetic amplifier comprising: an input transformer having a winding; an output circuit adapted to be connected to a load; a reactor having a saturable core with a gate winding thereon; a pair of half-wave rectifiers, said gate winding and said rectifiers being connected in series with said transformer winding and said output circuit with said rectifiers being oppositely polarized and with one of said rectifiers being connected to said transformer winding; and means providing a selectively variable resetting M.M.F. for said reactor core; said transformer winding having an extension portion with a resistor connected in series therewith, said serially connected extension portion of said transformer winding and said resistor being connected in parallel across said one rectifier, said extension portion of said transformer winding having a voltage induced therein causing current to flow during the gating half cycle in the series circuit of said extension winding and said resistor and through said one rectifier in a forward direction at least equal to the current drawn by said load thereby permitting superimposed load current to flow in a reverse direction through said one rectifier during said gating half cycle; said one rectifier blocking flow of transient current in said gate winding during the resetting half cycle responsive to a sudden change in said resetting M.M.F. in a direction to reduce said load current and said transformer winding extension portion voltage bucking flow of said transient current in said series circuit.

3. A self-saturating magnetic amplifier comprising: a pair of alternating current input terminals adapted to be connected to a source of alternating current; a pair of output terminals adapted to be connected to a load; a reactor having a saturable core with a gate winding and a direct current control winding thereon; a pair of oppositely polarized half-wave rectifiers, said gate winding and said rectifiers being connected in series between one of said input terminals and one of said output terminals with one of said rectifiers being connected to said input terminal; the other of said input and output terminals being connected together; circuit connections for impressing a selectively variable direct current voltage on said control winding thereby to provide a selectively variable resetting M.M.F. for said core; an auto-transformer having primary and extension windings with said primary winding being connected across said input terminals; and a resistor connected in a series circuit with said extension winding, said serially connected extension winding and resistor being connected in parallel across said one rectifier; said extension winding having a voltage induced therein causing current to flow during the gating half cycle in the series circuit of said extension winding and said resistor and through said one rectifier in a forward direction at least equal to the current drawn by superimposed load therefore permitting said load current to flow in a reverse direction through said one rectifier during said gating half cycle; said one rectifier blocking flow of transient current in said gate winding during the resetting half cycle responsive to a sudden change in said direct current voltage in a direction to reduce said load current and said extension winding voltage bucking flow of said transient current in said series circuit.

4. A self-saturating magnetic amplifier comprising: an alternating current input circuit adapted to be connected to a source of alternating current and an output circuit adapted to be connected to a load; a reactor having a saturable core with a pair of gate windings thereon; a first pair of half-wave rectifiers connected in a first series circuit with one of said gate windings and with said first pair of rectifiers being oppositely polarized; a second pair of half-wave rectifiers connected in a second series circuit with the other of said gate winding and with said second pair of rectifiers being oppositely polarized; said first and second series circuits being connected in parallel between said input and output circuits and forming a loop circuit; means providing a selectively variable resetting M.M.F. for said core; an auxiliary source of alternating current voltage; first impedance means connected in series with said auxiliary source, said serially connected first impedance means and said auxiliary source being connected in parallel across one of said first pair of rectifiers; second impedance means connected in series with said auxiliary source, said serially connected second impedance means and said auxiliary source being connected in parallel across one of said second pair of rectifiers which is oppositely polarized from said one of said first pair of rectifiers; said auxiliary source of voltage and said impedance means being respectively arranged to cause currents to flow during the gating half cycles of said gate windings in the parallel circuits including said auxiliary source and said impedance means and through the respective rectifiers in a forward direction at least equal to the currents drawn by said load through said first and second series circuits thereby permitting superimposed load currents to flow in a reverse direction through the respective rectifiers of said parallel circuits during said gating half cycles; said rectifiers in said parallel circuits respectively blocking the flow of transient current in said loop circuit during the resetting half cycles of said gate windings responsive to a sudden change in said resetting M.M.F. in a direction to reduce said load current; said auxiliary source of voltage blocking flow of said transient current in said parallel circuits.

5. A self-saturating alternating current output, full-wave magnetic amplifier comprising: a pair of alternating current input terminals adapted to be connected to a source of alternating current and a pair of output terminals adapted to be connected to a load; a reactor having a saturable core with a pair of gate windings and a direct current control winding thereon; a first pair of oppositely polarized half-wave rectifiers, one of said gate windings and said first pair of rectifiers being connected in series between one of said input terminals and one of said output terminals with one of said first pair of rectifiers being connected to said one input terminal; a second pair of oppositely polarized half-wave rectifiers, the other of said gate windings and said second pair of rectifiers being connected in series between said one input terminal and said one output terminal with one of said second pair of rectifiers being connected to said one input terminal and being oppositely polarized from said one rectifier of said first pair of rectifiers, said gate windings and said rectifiers forming a loop circuit; circuit connections for impressing a selectively variable direct current voltage on said control winding thereby to provide a selectively variable resetting M.M.F. for said core; said other input terminal being directly connected to said other output terminal; an auto-transformer having primary and extension windings with said primary winding being connected across said input terminal; a first resistor connected in series with said extension winding, said serially connected first resistor and extension winding being connected in parallel across said one rectifier of said first pair of rectifiers; a second resistor connected in series with said extension winding, said serially connected second resistor and extension winding being connected in parallel across said one rectifier of said second pair of rectifiers; said extension winding having a voltage induced therein respectively causing currents to flow during the gating half cycles of said gate windings in the parallel circuits including said extension winding and said resistors and through the respective rectifiers in a forward direction at least equal to the currents drawn by said load through said gate windings thereby permitting superimposed load currents to flow in a reverse direction respectively through said one rectifier of said first and second pair of rectifiers during said gating half cycles; said one rectifier of said first and second pair of rectifiers respectively blocking the flow of transient current in said loop circuit during the resetting half cycles of said gate windings responsive to a sudden change in said direct current voltage in a direction to reduce said load current, said extension winding voltage bucking the flow of said transient current in said parallel circuits.

References Cited in the file of this patent

UNITED STATES PATENTS

| | | |
|---|---|---|
| 2,757,297 | Evans et al. | July 31, 1956 |
| 2,764,723 | Scorgie | Sept. 25, 1956 |
| 2,773,134 | Dunnet | Dec. 4, 1956 |
| 2,808,990 | Van Allen | Oct. 8, 1957 |